United States Patent
Sasaki

Patent Number: 6,056,667
Date of Patent: May 2, 2000

[54] ENGAGING FORCE CONTROL SYSTEM OF A FLUID COUPLING

[75] Inventor: Kazuo Sasaki, Hiroshima, Japan

[73] Assignee: Mazda Motor Corporation, Hiroshima-ken, Japan

[21] Appl. No.: 09/209,155

[22] Filed: Dec. 10, 1998

[30] Foreign Application Priority Data

Dec. 19, 1997 [JP] Japan .................................. 9-365462

[51] Int. Cl.$^7$ .................................................. F16H 61/14
[52] U.S. Cl. .......................... 477/174; 477/175; 477/176; 477/901
[58] Field of Search .................................. 477/174, 175, 477/176, 180, 901

[56] References Cited

U.S. PATENT DOCUMENTS

| | | | |
|---|---|---|---|
| 4,393,467 | 7/1983 | Miki et al. ............................ | 477/901 X |
| 5,143,191 | 9/1992 | Nobumoto et al. ..................... | 477/176 |
| 5,807,204 | 9/1998 | Shiiba et al. .......................... | 477/176 |

FOREIGN PATENT DOCUMENTS

9-60718  3/1997  Japan .............................. F16H 61/14

Primary Examiner—Khoi Q. Ta
Attorney, Agent, or Firm—Sidley & Austin; Hugh A. Abrams

[57] ABSTRACT

An engaging force control system of a fluid coupling is provided with a fluid coupling disposed between an input element connected with an engine and an output member connected with a drive wheel side member and including a lock-up clutch which is selectively engaged with and disengaged from the input and output elements, an engaging force adjusting device for adjusting the engaging force of the lock-up clutch, a throttle opening sensor for sensing a value related to a throttle opening of the engine, a vehicle speed sensor for sensing a value related to a vehicle speed of a vehicle, an engaging force control device for controlling the engaging force adjusting device based on an engaging property which is predetermined based on the values related to the throttle opening and vehicle speed as parameters and the values sensed and, an uphill detecting device for detecting an uphill running condition of the vehicle. When an throttle opening increment amount after the detection of an uphill road exceeds a determination reference value in the case where an uphill road running condition is detected during an engagement of the lock-up clutch, the engaging force adjusting device being controlled to release the lock-up clutch. The responsiveness in the acceleration action can be improved.

5 Claims, 7 Drawing Sheets

ENGAGING FORCE CONTROL SYSTEM OF A FLUID COUPLING

BACKGROUND OF THE INVENTION

1. Field of the Invention

The present invention relates to an automatic transmission for an automotive vehicle, in particular, to an engaging force control device of lock-up clutch provided in a fluid coupling such as a torque converter.

2. Related Art

Generally, an automatic transmission provided in an automobile is constructed by a combination of a toque converter as a fluid coupling and a shift gear mechanism so as to switch a power transmitting path of the shift gear mechanism by means of a selective operation of a plurality of frictional elements such as clutches and brakes to thereby automatically establish a predetermined shift stage. It has been known that the torque converter is provided with a lock-up clutch which connects directly an input element from an engine with an output element to the shift gear mechanism.

Namely, the torque converter is provided with a pump (the input element) connected with an engine output shaft and integrally rotating with the shaft, a turbine (the output element) disposed facing to the pump and a stator disposed between the pump and the turbine to amplify a torque so as to transmit a rotation of the pump to the turbine through a operation fluid or hydraulic fluid and output the rotation transmitted from the pump to the shift gear mechanism through the turbine and the turbine shaft. In addition, the torque converter is provided with the lock-up clutch as a frictional member between the pump unit and the turbine unit. When the lock-up clutch is engaged, the input member of the torque converter or the output member of the engine is directly connected with the output member of the torque converter, namely the turbine or turbine shaft so as to rotate them integrally.

In this case, a property map is provided for determining the engagement or disengagement (release) of the lock-up clutch based on predetermined parameters of vehicle running conditions such as a throttle opening and a vehicle speed. The engaging condition of the lock-up clutch optimized to a current running condition of the vehicle is determined based on the property map of the detection of the running condition.

For example, when the vehicle is in a high engine and low vehicle speed condition, the lock-up clutch is disengaged or released in order to amplify the engine torque and absorb a shock during the shift operation to establish so called a converter condition.

While, when the vehicle is in a low engine load and high vehicle speed condition in which the above need is not so highly required, the lock-up clutch is fully engaged to establish so called a lock-up condition so as to enhance a power transmitting efficiency to thereby improve an engine fuel consumption performance.

Further, it has been known that the property map is provided with a slip zone in which the lock-up clutch is engaged with a certain amount of slip between the input and output elements the torque converter. In the slip condition, a slip control in which the slip amount is controlled to a predetermined target slip amount is carried out to absorb a vibration and the like while maintaining a desirable fuel consumption efficiency.

Meanwhile, when the vehicle runs into an uphill road, a running resistance against the vehicle running is increased due to a gradient of the uphill road to cause a speed reduction of the vehicle running. Under this condition, a driver tends to increase an acceleration pedal stroke, or increase a throttle opening to maintain the vehicle speed regardless of the gradient of the road. In this case, when the vehicle operating condition is shifted from the lock-up condition or slip condition to the converter condition in response to the increase of the throttle opening in connection with the stroke operation of the acceleration pedal, the lock-up clutch is disengaged so that an engine speed or engine driving force may be abruptly increased to cause an uncomfortable feeling for the driver.

In view of this problem, it has been proposed that the target slip amount is increased in response to the increase the road surface gradient of the vehicle running. According to the proposal, the target value of the slip amount is increased in the uphill road. Therefore, even though the vehicle operating condition is shifted from the slip condition to the converter condition due to the increase of the throttle opening, an abrupt fluctuation of the engine speed is suppressed because the difference between the actual slip amount in the slip control and the slip amount on the release of the lock-up clutch is reduced. On the other hand, the target slip amount is immediately increased on running into the uphill road. The actual slip amount is increased to achieve the target value without any stroke operation of the acceleration pedal and to increase the engine speed. As a result, the driver may feel uncomfortable as well under this condition.

In another aspect, when the acceleration pedal is stroked to compensate an insufficient driving power due to the increase of the running resistance resulting from the gradient of the road surface in the case where the vehicle runs into an uphill road in the course of the acceleration, the vehicle operating zone is shifted from the lock-up zone or slip zone to the converter zone so that the lock-up clutch is released to increase the driving power. When the acceleration pedal is stroked back to suppress an undue increase of the driving power, the running condition is shifted back to the lock-up zone or slip zone to engage the lock-up clutch to cause the insufficient driving power. Thus, a hunting phenomenon is caused with regard to the driving power of the engine.

In order to deal with the above problem, a Japanese Patent Unexamined publication No. 9-60718 which has been issued as a U.S. Pat. No. 5,807,204 discloses that once the throttle opening is shifted from a predetermined slip zone to a converter zone during the uphill running, the shift from the converter to the slip condition is prohibited. According to this idea, once the lock-up clutch is released during the uphill running, the lock-up clutch is maintained at the released condition. That is, the repetition of the engagement and the disengagement of the lock-up clutch is prevented to avoid the above problem.

However, the above technique described in the U.S. patent would produce the following problem due to the fact that the slip control is not stopped until the acceleration stroke or the throttle opening is increased beyond a predetermined value.

Namely, When the acceleration pedal is stroked to accelerate the vehicle for some reason when the vehicle runs on an uphill road in the slip control condition of the lock-up clutch, the slip condition is not stopped until the throttle opening is increased beyond a predetermined value and the lock-up condition is maintained. As a result, the torque converter does not exert the torque amplification function so that the driver may feel uncomfortable due to the shortage of the driving power.

Similar problem would occur when the acceleration pedal is stroked for acceleration during the lock-up control condition.

SUMMARY OF THE INVENTION

It is therefore an object of the invention to deal with the above problems with regard to the fluid coupling.

In particular, it is an object of the present invention to provide a desirable control of the engaging force of the lock-up clutch in response to the driver's operation during an uphill running.

It is further object of the present invention to eliminate an uncomfortable feeling for the driver during the uphill road running. The above and other objects of the present invention can be accomplished by an engaging force control system of a fluid coupling comprising; a fluid coupling disposed between an input element connected with an engine and an output member connected with a drive wheel side member and including a lock-up clutch which is selectively engaged with and disengaged from the input and output elements, an engaging force adjusting device for adjusting the engaging force of the lock-up clutch, a throttle opening sensor for sensing a value related to a throttle opening of the engine, a vehicle speed sensor for sensing a value related to a vehicle speed of a vehicle, an engaging force control device for controlling the engaging force adjusting device based on an engaging property which is predetermined based on the values related to the throttle opening and vehicle speed as parameters and the values sensed, and, an uphill detecting device for detecting an uphill running condition of the vehicle, and, when an throttle opening increment amount after the detection of an uphill road exceeds a determination reference value in the case where an uphill road running condition is detected during an engagement of the lock-up clutch, the engaging force adjusting device being controlled to release the lock-up clutch.

In a preferred embodiment of the present invention, the engaging force control device holds a minimum value of the throttle opening after the detection of the uphill road as a calculation start point for the throttle opening increment amount, and wherein when a value of the throttle opening is smaller than the calculation start point which is held, the value of the throttle opening is introduced as a new value of the calculation start point for the throttle opening increment value.

Preferably, as the throttle opening increment amount is increased, the engaging force control device reduces a determination reference value of the throttle opening for a release of the lock-up clutch.

In another preferred embodiment, the improvement is provided with a road gradient detecting device for detecting a value related to a gradient of road surface on which the vehicle runs. Thee engaging control device reduces a determination reference value of the throttle opening for a release of the lock-up clutch as the gradient of the road surface is increased.

In preferred embodiment of the present invention, the improvement comprises an acceleration and deceleration detecting device for detecting a value related to an acceleration and deceleration of the vehicle. In this case, the engaging control device reduces a determination reference value of the throttle opening for a release of the lock-up clutch as the deceleration of the vehicle is increased.

In further embodiment of the present invention, the engaging control device reduces a determination reference value of the throttle opening for a release of the lock-up clutch as the vehicle speed is increased.

According to the above features of the present invention, the following functions can be obtained. When the vehicle is in a predetermined engaged zone in the case where the vehicle runs on a flat road, the lock-up clutch is controlled to an engaged condition to reduce the engine vibration as well as improve the fuel consumption efficiency.

When the throttle opening increment amount exceeds the determination reference value after an uphill road is detected in the case where the vehicle runs into the uphill road during the slip control of the vehicle, the lock-up clutch is released regardless of the value of the throttle opening. Thus, when the driver strokes the acceleration pedal for accelerating the vehicle, the lock-up clutch is responsively released to establish the converter condition. As a result, a desirable responsiveness for the accelerating operation of the vehicle can be obtained so that the driver does not feel uncomfortable.

The minimum value of the throttle opening after the detection of the uphill is held as the calculation start point of the throttle opening increment amount. Therefore, for example, even though the acceleration pedal is stroked deeply and thereafter the pedal is stroked back little by little repeatedly, the initial value of the throttle opening in the determination of the uphill road is held as a calculation start point of the throttle opening increment amount. When the throttle opening exceeds the determination reference value Do with regard to the value as a reference value, the slip control of the lock-up clutch is released. Accordingly, the reliability of the control can be obtained.

When a detected value of the throttle opening is reduced below the initial value of the throttle opening which is set for the calculation start point due to the fact that the acceleration pedal is stroked back in the course of the uphill road running, the detected value is newly provided for the calculation start point, in other words, the value is renewed. As a result, it is effectively prevented that the lock-up clutch is unduly released when the acceleration pedal is slightly stroked.

According to another feature of the present invention, the throttle opening increment amount is increased, the determination reference value is reduced so that as the increment of the acceleration of the throttle opening is increased, in other words, as a stroke speed of the acceleration pedal is increased, the determination reference value is reduced. As a result, the slip control condition is promptly terminated to release the lock-up clutch when an abrupt acceleration is needed so that a desirable responsiveness for the acceleration can be obtained.

In another embodiment of the present invention, as the gradient value is increased, the determination reference value is reduced. Accordingly, the engaged condition of the lock-up clutch is promptly released as the gradient is increased so that a desirable acceleration responsiveness of the vehicle can be obtained.

In further embodiment of the present invention, as the deceleration is increased, the determination reference value is reduced. Accordingly, the vehicle can be effectively accelerated against the reduction of the vehicle speed.

In another embodiment of the present invention, as the vehicle speed is increased, the determination reference value is reduced. Accordingly, the vehicle can be effectively accelerated against the air resistance even under a high vehicle speed condition.

Further objects, features and advantages of the present invention will become apparent from the Detailed Description of Preferred Embodiments which follows when read in light of the accompanying Figures.

DETAILED DESCRIPTION OF THE PREFERRED EMBODIMENTS

Hereinafter, the present invention will be described taking reference with the attached drawings.

Figure 1:
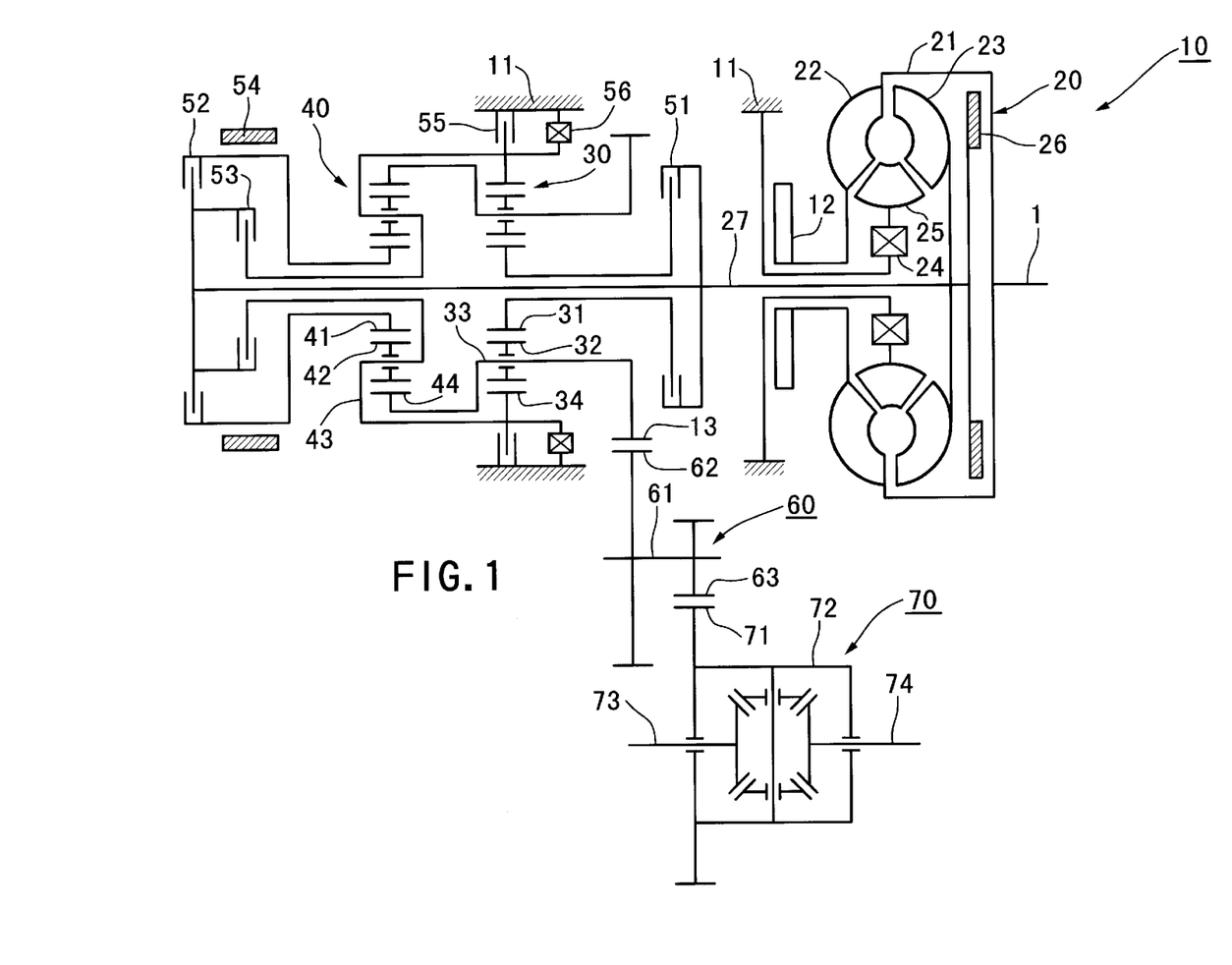
FIG. 1 is a skeleton of a structure of an automatic transmission according to a preferred embodiment of the present invention.

A mechanical structure of an automatic transmission 10 according to the preferred embodiment of the present invention will be schematically explained referring to a skeleton of FIG. 1.

The transmission 10, as main elements, is provided with a torque converter 20, first and second planetary gear mechanisms 30, 40 disposed adjacently with the torque converter 20 for being driven by the torque converter 20 as transmission gear mechanism, a plurality of frictional elements 51–55 such as clutches and brakes and one way clutch 56 for switching a power transmitting pass constituted by the planetary gear mechanisms 30 and 40 so as to establish 1–4 shift positions in D range, 1–3 shift positions in S range, 1–2 shift positions in L range and reverse shift position in R range.

The torque converter 20 is provided with a pump 22 disposed rigidly in a case 21 which connected to an engine output shaft 1, a turbine 23 disposed facing to the pump 22 and driven by the pump 22 through a hydraulic fluid, a stator 25 disposed between the pump 22 and turbine 23 and born by transmission case 11 through one way clutch 24 to amplify an engine torque, and a lock-up clutch 26 disposed between the case 21 and the turbine 23 to directly engage the engine output shaft 1 with the turbine 23. The rotation of the turbine 23 is transmitted through the turbine shaft 27 to the planetary gear mechanism.

In this structure, an oil pump 12 which is driven by the engine output shaft 1 through the case 21 of the torque converter 20 is disposed opposite to the engine with regard to the torque converter 20.

The first and second planetary gear mechanisms 30 and 40 are respectively provided with sun gears 31, 41, a plurality of pinions 32-32, 42-42 meshed with the sun gears, pinion carriers 33, 43 for supporting the pinions 32-32, 42-42 and internal gears 34, 44 meshed with the pinions 32-32, 42-42.

Between the turbine shaft 27 and the sun gear 31 of the first planetary gear mechanism 30 is disposed a forward clutch 51. Similarly, between the turbine shaft 27 and the sun gear 41 of the second planetary gear mechanism 40 is disposed a reverse clutch 52. Further, between the turbine shaft 27 and the pinion carrier 43 of the second planetary gear mechanism 40 is disposed a 3–4 clutch 53. A 2–4 brake is provided for fixing the sun gear 41 of the second planetary gear mechanism 40.

The internal gear 34 of the first planetary gear mechanism 30 is connected with the pinion carrier 43 of the second planetary gear mechanism 40. Between these elements and transmission case 11 are disposed a low reverse brake 55 and one way clutch 56 in parallel with each other. The pinion carrier 33 of the first planetary gear mechanism 30 is connected with the internal gear 44 of the second planetary gear mechanism 40. These elements are connected with an output gear 13. The output gear 13 is meshed with a first intermediate gear 62 on an idle shaft 61 which constitutes an intermediate transmitting mechanism 60. An second intermediate gear 63 on the idle shaft 61 is meshed with an input gear 71 of a differential gear mechanism 70 so that the roation of the output gear 13 is introduced to a differential case 72 of the differential gear mechanism 70 to drive right and left wheel axles 73 and 64 through the differential gear mechanism.

Table 1 shows a relation ship between the operating conditions of the frictional elements, such as the clutches and brakes 51–55 and the one way clutch and shift stages.

TABLE 1

| | Forward clutch (51) | 2-4 Brake (54) | 3-4 Clutch (53) | Low Reverse Brake (55) | Reverse Clutch (52) | One Way Clutch (56) |
| --- | --- | --- | --- | --- | --- | --- |
| 1st | ◯ | | | (◯) | | ◯ |
| 2nd | ◯ | ◯ | | | | |
| 3rd | ◯ | | ◯ | | | |
| 4th | | ◯ | ◯ | | | |
| Reverse | | | | ◯ | ◯ | |

(◯) Only in L Range

Figure 2:
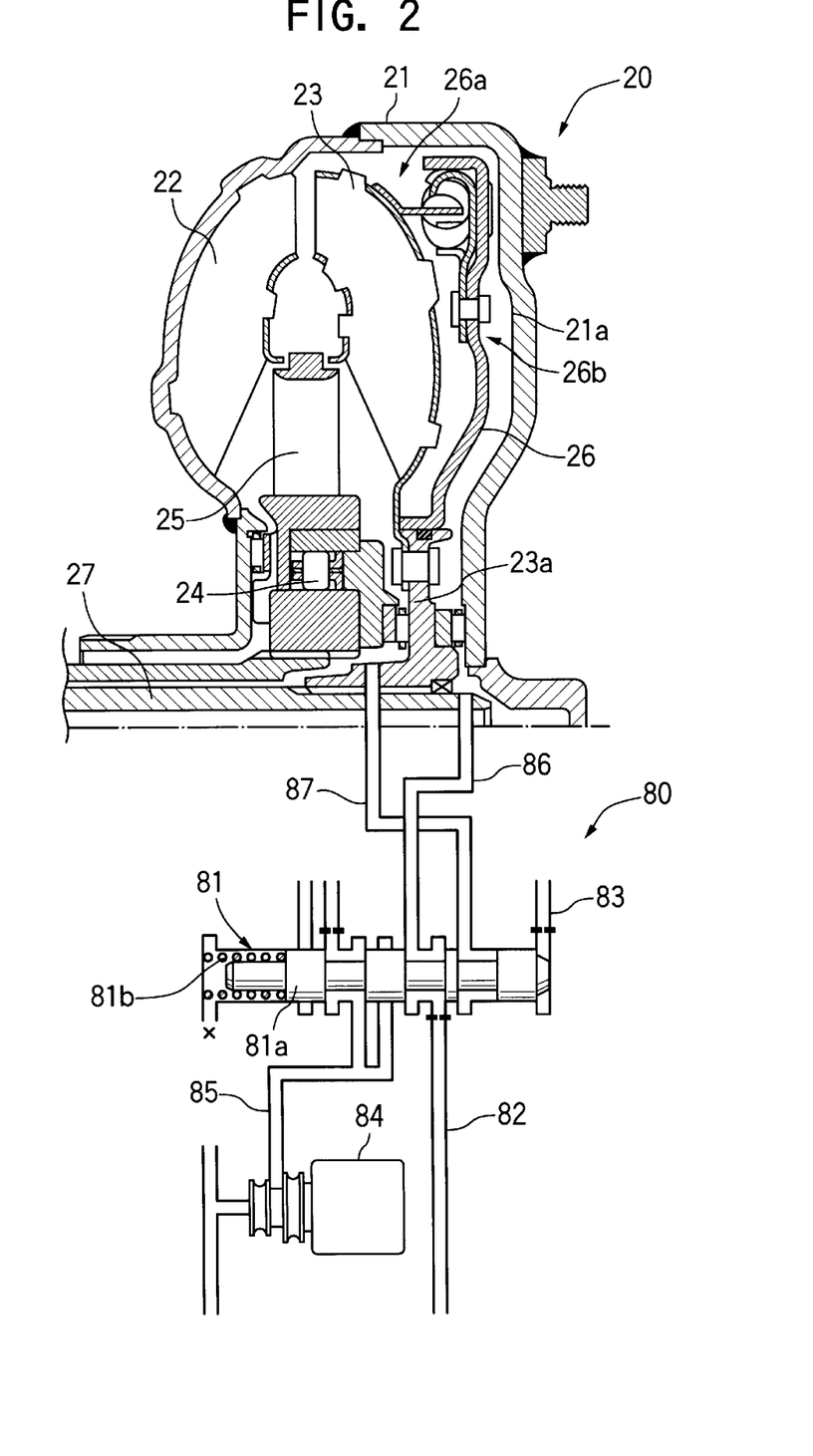
FIG. 2 is a lock-up clutch and a hydraulic control circuit therefor.

The torque converter 20 is constructed as shown in FIG. 2. In detail, the torque converter 20 is provided with the pump 22 including multiple impellers integrally fixed to the case 21 mounted on the engine output shaft 1 in a half side of the case 21 opposite to the engine, the turbine including multiple impellers rotatably relative to the case 21 in another half side of the case 21 close to the engine and disposed facing to the pump 22, and the stator 25 including multiple impellers as well disposed at an internal circumferential area formed between the pump 22 and the turbine 23, born by the transmission case 11 through the one way clutch 24 and rotatable in a predetermined direction. A boss 23a of the turbine 23 is brought into a spline engagement with the turbine shaft 27 so that the rotation of the turbine 23 is transmitted to the transmission gear mechanism positioned opposite to the engine through the turbine shaft 27.

In the case 21 is built the lock-up clutch 26 integrally rotating with the turbine 23 and slidable with regard to the turbine 23 in an axial direction. The lock-up clutch 26 is disposed facing to an engine side planer portion 21a of the case 21 so that when the lock-up clutch 26 is engaged with the planer portion 21a, the engine output shaft 1 is directly connected with the turbine shaft 23.

The lock-up clutch 26 is urged against the planer portion 21a of the case 21 by virtue of the hydraulic pressure in a chamber behind the clutch 26, or a rear chamber 26a to be brought into engagement, is to be released due to the hydraulic pressure supplied to a chamber between the clutch 26 and the planer portion 21a, or a front chamber 26b, and is to be controlled to the slip condition by means of the control of the hydraulic pressure of the front chamber 26b.

Hereinafter, a control system of the lock-up clutch 26 within the hydraulic circuit provided in the automatic transmission 10 will be explained briefly. As shown in FIG. 2, the hydraulic circuit 80 is provided with a lock-up control valve 81 for controlling the hydraulic pressure acting on the rear chamber 26a and front chamber 26b of the lock-up clutch 26. To the valve 81 are connected a line 82 for supplying a converter pressure which is produced by adjusting a hydraulic pressure source to a constant pressure, a line 83 for supplying a pilot pressure, and a line 85 for supplying a control pressure produced by a duty solenoid valve 84.

When the pilot pressure is not supplied from the line 83, a spool 81a is positioned at a right side as shown in Figure due to a resilient force or urging force of a spring 81b so that the converter pressure is supplied from the line 82 to the front chamber 26b of the lock-up clutch 26 through the line 86 to thereby release or disengage the clutch 26 (converter condition). When the pilot pressure is introduced, the spool is moved to the left side in the drawing against the urging force of the spring 81b so that the converter pressure is introduced to the rear chamber 26a of the clutch 26 through the line 87 to engage the lock-up clutch 26 (lock-up condition).

In the engaged condition, the control pressure produced by the duty solenoid valve 84 and introduced through the line 85 is introduced to the front chamber 26b through the lock-up control valve 81 and line 86 so that the control pressure is introduced into the front chamber 26b while the predetermined converter pressure is introduced to the rear chamber 26a. As a result, the slip amount between the pump 22 and the turbine 23 of the torque converter 20, or the engaging force of the lock-up clutch 26 is controlled in accordance with the value of the control pressure (slip condition).

Figure 3:
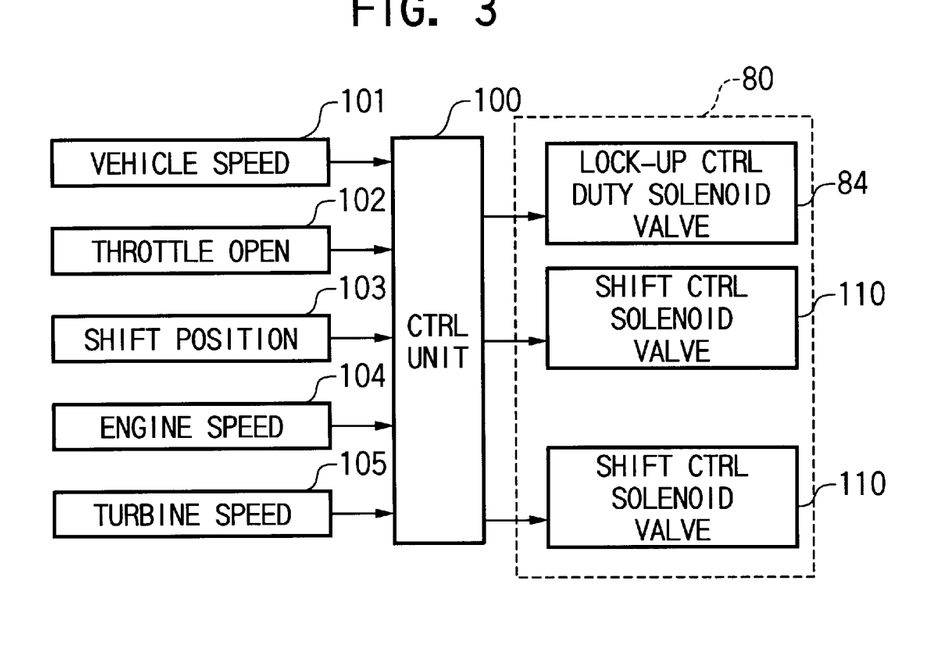
FIG. 3 is a control system for the lock-up clutch.

Meanwhile, the automatic transmission 10, as shown in FIG. 3, is provided with a control unit 100 for executing the shift control and the control for the lock-up control. The control unit 100 receives signals from a vehicle speed sensor 101 for detecting a vehicle speed of the vehicle, throttle opening sensor 102 for detecting the throttle opening of the engine, shift position sensor 103 for detecting the shift position (range) selected by the driver, engine speed sensor 104 for detecting an engine rotation speed which is introduced to the torque converter 20, and a turbine speed sensor 105 for detecting a turbine rotation speed which is outputted from the torque converter 20. The control unit 100 determines the shift stage based on a shift map in light of the vehicle running condition, in particular, a vehicle speed Vs and throttle opening Tvo as parameters obtained from the sensors 101–105 and produces control signals to a plurality of solenoid valves 110-110 for shift operation.

Figure 4:
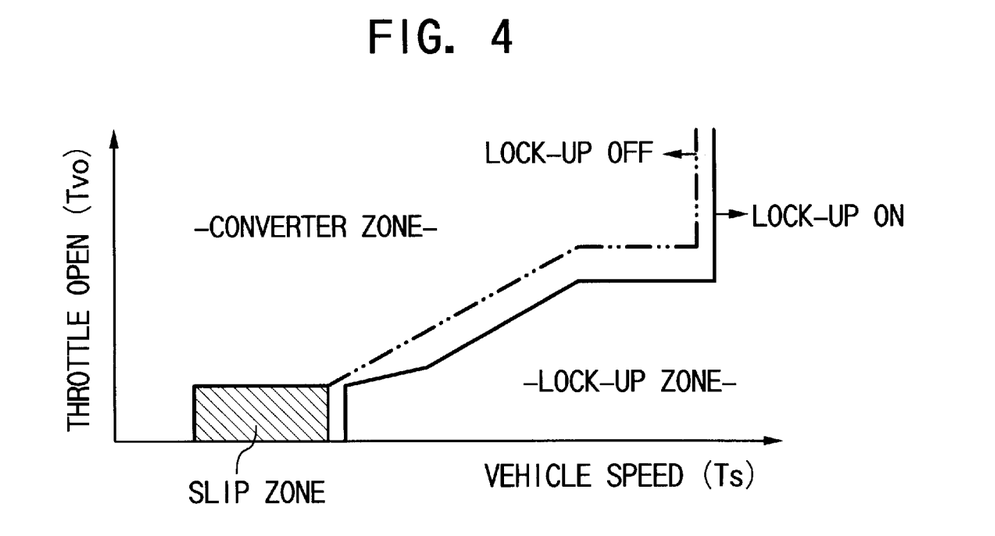
FIG. 4 is a map showing a control zone of the lock-up clutch.

In addition, the control unit 100 determines the control zones of the lock-up clutch 26 based on an engaging force property map as shown in FIG. 4 in light of the vehicle running condition, in particular, a vehicle speed Vs and throttle opening Tvo as parameters obtained from the sensors 101–105 to thereby control the lock-up clutch 26 to the converter condition, lock-up condition or the slip condition, and produces a control signals to the duty solenoid valve 84 for the lock-up control of the hydraulic circuit 80.

In this case, the high engine load and low vehicle speed zone in which the torque amplification function of the torque converter 20 and shock absorbing function during the shift operation and the like are required is defined as the converter zone in which the lock-up clutch 26 is fully released. On the other hand, when the vehicle is in an low engine load and high vehicle speed zone in which the above functions of the torque converter 20 are not so strongly required as the converter condition, it is determined that the vehicle is in the lock-up zone. In this case, the lock-up clutch 26 is fully engaged to improve the fuel consumption efficiency of the engine. When the vehicle is in a low engine load and low vehicle speed zone, it is determined that the vehicle is in the slip zone in which the lock-up clutch 26 is controlled to a target slip amount of the lock-up clutch 26 to improve the fuel consumption efficiency while properly absorbing the engine vibration.

Figure 5:
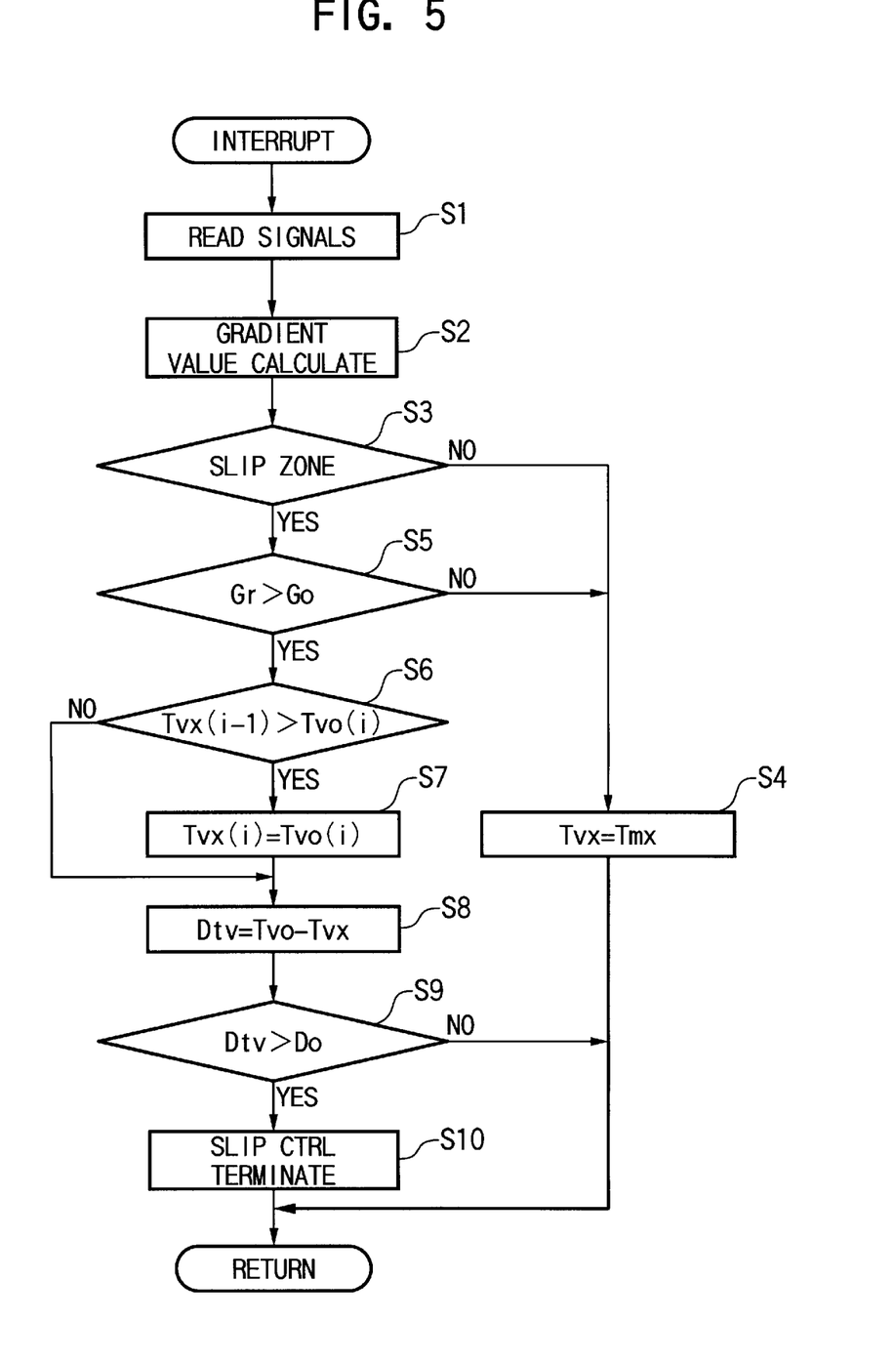
FIG. 5 is a flow chart showing an interrupt routine for the lock-up clutch control.

According to the illustrated embodiment, an interrupt routine for an engaging force control of the lock-up clutch 26 is carried out in accordance with the flow chart shown in FIG. 5. The control unit 100 reads in signals from the sensors 101–105 in step S1, calculates a gradient value Gr of a road surface on which the vehicle is running in step S2. The vehicle runs against various kinds of running resistance, such as air resistance, road surface resistance and the like. In an uphill road, a gradient resistance in proportion to the gradient of the uphill is added to the running resistance. A kinetic equation during the running of the vehicle can be generally provided as follows:

$$MAc=(\text{running power})-(\text{air resistance})-(\text{gradient resistance})-(\text{road surface resistance})-(\text{other resistance}) \quad (1)$$

wherein M: mass of the vehicle,

Ac: acceleration in the fore and aft direction. The running power is a variable which can be derived based on the engine output taking account of reduction ratio and mechanical resistance and the like. The air resistance is a variable which is proportional to the square of the vehicle speed Vs. Now, the gradient Gr is to be obtained. For this purpose, the equation 1 is reformed to calculate the gradient Gr. After the calculation of the gradient Gr, the control unit 100 goes to step S3 and determines if the running condition is in the slip zone. If it is determined that the vehicle running condition is not in the slip zone, the control unit 100 executes step S4 to set a predetermined initial value Tmx as a calculation start point Tvx for the throttle opening increment amount Dtv. In the illustrated embodiment, a full open value of the throttle opening is employed as an initial value Tmx.

On the other hand, if it is determined that the vehicle running condition is in the slip zone in the step S3, the control unit 100 goes to step S5 and determines if the gradient value Gr is greater than a predetermined value G0, in other words, determines if the vehicle is in an uphill road. When the control unit 100 determines that the gradient value Gr is greater than the predetermine value G0 in the step S5, the control unit 100 goes to step S6 and determines if the precedent value of the calculation start value Tvx is greater than the present value of the throttle opening Tvo. If this judgment is Yes, the control unit 100 executes step S7 to renew the value Tvx by introducing the present value of the throttle opening Tvo. Thereafter, the control unit 100 executes step S8 in which the throttle opening Tvo is the value Tvx to obtain the throttle opening increment amount Dtv. If the judgment in the step S6 is No, the control unit 100 skips the step S7 and goes to the step S8 and calculates the throttle opening increment value Dtv. Thus, the control unit 100 holds the minimum value of the throttle opening Tvo after the detection of the uphill as a calculation start point Tvx of the throttle opening increment amount Dtv. If the throttle opening Tvo is smaller than a value Tvx which is presently held, the control unit 100 renews the value Tvx by the current value of the throttle opening Tvo and calculates the throttle opening increment amount Dtv. In this case, when it is determined that the vehicle running condition is in an uphill road, an uphill road flag Fu is set at a value 1.

After the control unit 100 calculates the throttle opening increment amount Dtv, the control unit 100 executes step S9 and determines if the throttle opening increment amount Dtv is greater than a predetermined reference value Do. If the value Dtv is greater than the reference value Do, the control unit executes step S10 and terminates the slip control. In this case, in the illustrated embodiment shown in FIG. 6, as the throttle opening increment amount Dtv is increased, the determination reference value Do is reduced.

In operation, when the vehicle is in the slip zone in light of the engaging force property map as shown in FIG. 4 in the case where the vehicle runs on a flat road, the lock-up clutch 26 is controlled to the slip condition to reduce the engine vibration as well as improve the fuel consumption efficiency.

When the throttle opening increment amount Dtv exceeds the determination reference value Do after an uphill road is detected in the case where the vehicle runs into the uphill road during the slip control of the vehicle, the lock-up clutch 26 is released regardless of the value of the throttle opening Tvo. Thus, when the driver strokes the acceleration pedal for accelerating the vehicle, the lock-up clutch is responsively released to establish the converter condition. As a result, a desirable responsiveness for the accelerating operation of the vehicle can be obtained so that the driver does not feel uncomfortable.

Figure 6:
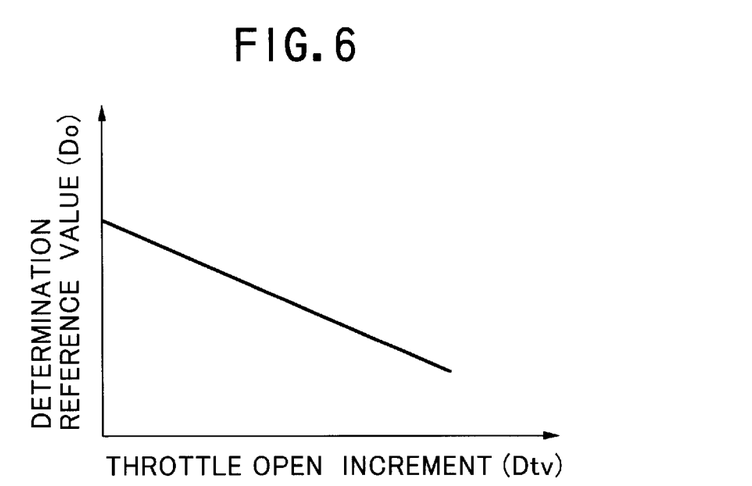
FIG. 6 is an explanatory view of a map of a determination reference value based on the throttle opening increment as a parameter.

In this case, as shown in FIG. 6, as the throttle opening increment amount Dtv is increased, the determination reference value Do is reduced so that as the increment of the acceleration of the throttle opening is increased, in other words, as a stroke speed of the acceleration pedal is increased, the determination reference value is reduced. As a result, the slip control condition is promptly terminated to release the lock-up clutch 26 when an abrupt acceleration is needed so that a desirable responsiveness for the acceleration can be obtained.

Figure 7:
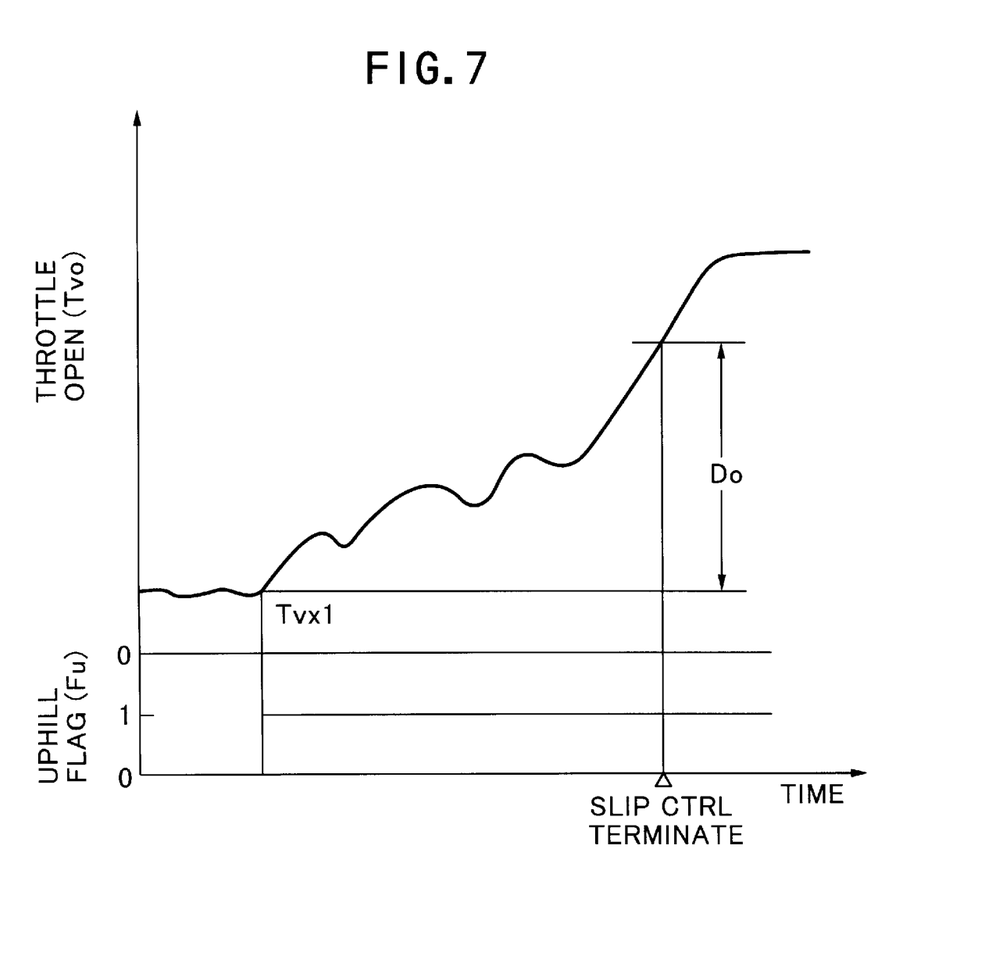
FIG. 7 is a time chart showing an operation of the lock-up clutch in accordance with the present invention.

In addition, as shown the steps 6 and 7 in FIG. 5, the minimum value of the throttle opening Tvo after the detection of the uphill is held as the calculation start point Tvx of the throttle opening increment amount Dtv. Therefore, for example, even though the acceleration pedal is stroked deeply and thereafter the pedal is stroked back little by little repeatedly as shown in FIG. 7, the initial value Tvx1 of the throttle opening Tvo in the determination of the uphill road is held as a calculation start point Tvx of the throttle opening increment amount Dtv. When the throttle opening Tvo exceeds the determination reference value Do with regard to the value Tvx (Tvx1) as a reference value, the slip control of the lock-up clutch is released. Accordingly, the reliability of the control can be obtained.

Figure 8:
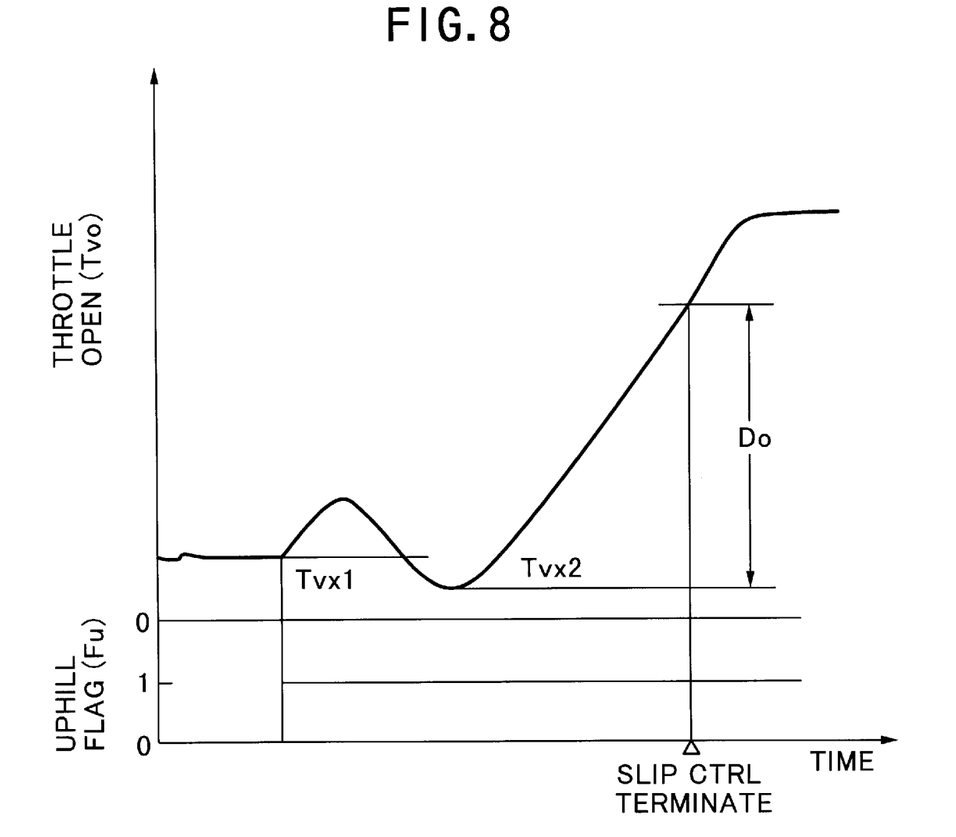
FIG. 8 is another time chart showing an operation of the lock-up clutch in accordance with the present invention.

On the other hand, for example, as shown in FIG. 8, when a detected value Tvx2 of the throttle opening Tvo is reduced below the initial value Tvx1 of the throttle opening Tvo which is set for the calculation start point Tvx due to the fact that the acceleration pedal is stroked back in the course of the uphill road running, the detected value Tvx2 is newly provided for the calculation start point Tvx, in other words, the value Tvx is renewed. As a result, it is effectively prevented that the lock-up clutch 26 is unduly released when the acceleration pedal is slightly stroked.

Figure 9:
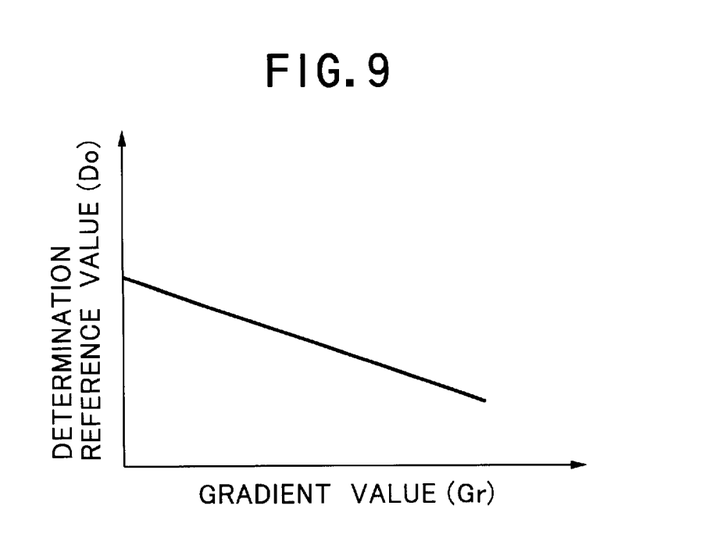
FIG. 9 is an explanatory view of a map of a determination reference value based on a gradient value of an uphill road as a parameter in accordance with another embodiment.

In another embodiment of the present invention, as the gradient value Gr is increased as shown in the map of FIG. 9, the determination reference value Do is reduced. Accordingly, the engaged condition of the lock-up clutch 26 is promptly released as the gradient is increased so that a desirable acceleration responsiveness of the vehicle can be obtained.

Figure 10:
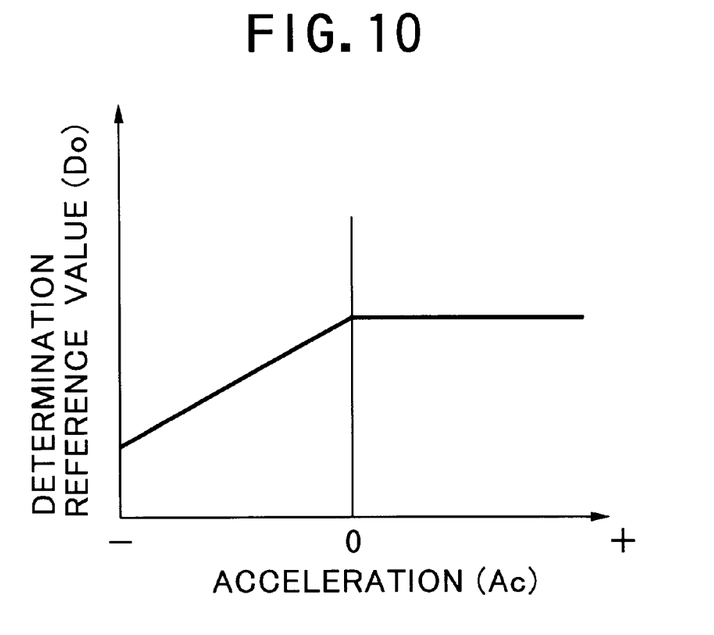
FIG. 10 is an explanatory view of a map of a determination reference value based on a fore and aft acceleration of the vehicle as a parameter in accordance with a still further embodiment of the present invention.

In further embodiment of the present invention, as the acceleration Ac in the fore and aft direction is increased in the negative direction with regard to zero point as shown in FIG. 10, in other words, as a deceleration of the vehicle is increased, the determination reference value Do is reduced. In this case, the acceleration Ac can be obtained based on the vehicle speed Vs. Accordingly, the vehicle can be effectively accelerated against the reduction of the vehicle speed.

Figure 11:
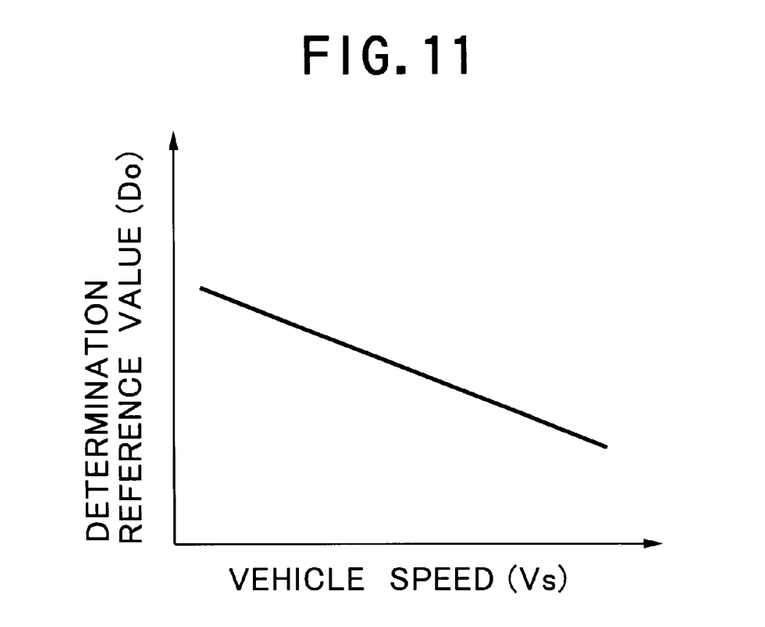
FIG. 11 is an explanatory view of a map of a determination reference value based on a vehicle speed as a parameter in accordance with a further embodiment of the present invention.

In another embodiment of the present invention, as the vehicle speed Vs is increased as shown in the map of FIG. 11, the determination reference value Do is reduced. Accordingly, the vehicle can be effectively accelerated against the air resistance even under a high vehicle speed condition.

Meanwhile, the present invention can be properly applied to a vehicle running condition where the vehicle runs into an uphill road during the lock-up control by the lock-up clutch 26.

According to the present invention, in the engaging force control device of a fluid coupling with a lock-up clutch, when the throttle opening increment amount after the detection of the uphill road exceeds a predetermined determination reference value in the case where the vehicle runs into an uphill road during the engaged condition of the lock-up clutch, the lock-up clutch is released regardless of the value of the throttle opening. As a result, when the driver strokes the acceleration pedal for the acceleration of the vehicle, the engaged condition of the lock-up clutch 26 is promptly released so that a desirable acceleration response can be obtained without uncomfortable feeling for the driver.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. An engaging force control system of a fluid coupling comprising;

a fluid coupling disposed between an input element connected with an engine and an output member connected with a drive wheel side member and including a lock-up clutch which is selectively engaged with and disengaged from the input and output elements;

an engaging force adjusting device for adjusting the engaging force of the lock-up clutch;

a throttle opening sensor for sensing a value related to a throttle opening of the engine;

a vehicle speed sensor for sensing a value related to a vehicle speed of a vehicle;

an engaging force control device for controlling the engaging force adjusting device based on an engaging property which is predetermined based on the values related to the throttle opening and vehicle speed; and, an uphill detecting device for detecting an uphill running condition of the vehicle; and, when an throttle opening increment amount after the detection of an uphill road exceeds a determination reference value in the case where an uphill road running condition is detected during an engagement of the lock-up clutch, the engaging force adjusting device being controlled to release the lock-up clutch; and, wherein the engaging force control device holds a minimum value of the throttle opening after the detection of the uphill road as a calculation start point for the throttle opening increment amount, and, wherein when a value of the throttle opening is smaller than the calculation start point which is held, the value of the throttle opening is introduced as a new value of the calculation start point for the throttle opening increment value.

2. An engaging force control system as recited in claim 1 wherein as the throttle opening increment amount is increased, the engaging force control device reduces a determination reference value of the throttle opening for a release of the lock-up clutch.

3. An engaging force control system as recited in claim 1 wherein the improvement comprises a road gradient detecting device for detecting a value related to a gradient of road surface on which the vehicle runs, and the engaging control device reduces a determination reference value of the throttle opening for a release of the lock-up clutch as the gradient of the road surface is increased.

4. An engaging force control system as recited in claim 1 wherein the improvement comprises an acceleration and deceleration detecting device for detecting a value related to an acceleration and deceleration of the vehicle, and the engaging control device reduces a determination reference value of the throttle opening for a release of the lock-up clutch as the deceleration of the vehicle is increased.

5. An engaging force control system as recited in claim 1 wherein the engaging control device reduces a determination reference value of the throttle opening for a release of the lock-up clutch as the vehicle speed is increased.

* * * * *